United States Patent
Di et al.

(10) Patent No.: US 10,310,859 B2
(45) Date of Patent: Jun. 4, 2019

(54) SYSTEM AND METHOD OF SPECULATIVE PARALLEL EXECUTION OF CACHE LINE UNALIGNED LOAD INSTRUCTIONS

(71) Applicant: VIA ALLIANCE SEMICONDUCTOR CO., LTD., Shanghai (CN)

(72) Inventors: Qianli Di, Beijing (CN); Junjie Zhang, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 180 days.

(21) Appl. No.: 14/963,154

(22) Filed: Dec. 8, 2015

(65) Prior Publication Data

US 2017/0139718 A1    May 18, 2017

(30) Foreign Application Priority Data

Nov. 18, 2015    (CN) .......................... 2015 1 0794204

(51) Int. Cl.
*G06F 9/38* (2018.01)
*G06F 9/30* (2018.01)
(Continued)

(52) U.S. Cl.
CPC ........ *G06F 9/3836* (2013.01); *G06F 9/30021* (2013.01); *G06F 9/30043* (2013.01); *G06F 9/32* (2013.01); *G06F 9/3455* (2013.01); *G06F 9/3824* (2013.01); *G06F 9/3832* (2013.01); *G06F 9/3867* (2013.01);
(Continued)

(58) Field of Classification Search
None
See application file for complete search history.

(56) References Cited

U.S. PATENT DOCUMENTS

2006/0184738 A1*    8/2006  Bridges ............... G06F 9/30043
                                                    711/125
2011/0047314 A1*    2/2011  Pogor ................. G06F 11/3648
                                                    711/3

OTHER PUBLICATIONS

Reddy et al., "Understanding prediction-based partial redundant threading for low-overhead, high-coverage fault tolerance", Oct. 21-25, 2006, Proceedings of the 12th international conference on Architectural support for programming languages and operating systems, pp. 83-94 (Year: 2006).*

* cited by examiner

*Primary Examiner* — John M Lindlof
(74) *Attorney, Agent, or Firm* — McClure, Qualey & Rodack, LLP (57) ABSTRACT

A system and method of performing speculative parallel execution of a cache line unaligned load instruction including speculatively predicting whether a load instruction is unaligned with a cache memory, marking the load instruction as unaligned and issuing the instruction to a scheduler, dispatching the unaligned load instruction in parallel to first and second load pipelines, determining corresponding addresses for both load pipelines to retrieve data from first and second cache lines incorporating the target load data, and merging the data retrieved from both load pipelines. Prediction may be based on matching an instruction pointer of a previous iteration of the load instruction that was qualified as actually unaligned. Prediction may be further based on using a last address and a skip stride to predict a data stride between consecutive iterations of the load instruction. The addresses for both loads are selected to incorporate the target load data.

20 Claims, 3 Drawing Sheets

(51) Int. Cl.
*G06F 9/345* (2018.01)
*G06F 9/32* (2018.01)
*G06F 12/0875* (2016.01)

(52) U.S. Cl.
CPC ........ *G06F 9/3885* (2013.01); *G06F 12/0875* (2013.01); *G06F 2212/452* (2013.01)

SYSTEM AND METHOD OF SPECULATIVE PARALLEL EXECUTION OF CACHE LINE UNALIGNED LOAD INSTRUCTIONS

BACKGROUND OF THE INVENTION

Field of the Invention

The present invention relates in general to the process of executing load instructions to load information from memory in a microprocessor, and more particularly to a system and method of speculative parallel execution of cache line unaligned load instructions to load data that crosses a cache line boundary.

Description of the Related Art

Computer programs include instructions to perform the functions of the program including load instructions to read data from memory. A typical computer system includes a microprocessor for executing the instructions, and an external system memory coupled to the microprocessor for storing portions of the computer program and applicable data and information. Loading data from the system memory consumes valuable processing time, so the microprocessor typically includes a smaller and significantly faster cache memory for loading data for processing. The cache memory is typically incorporated within the microprocessor for faster access. The cache memory may be externally located, but if so is usually connected via a separate and/or dedicated cache bus to achieve higher performance. Blocks of data may be copied into the cache memory at a time, and the microprocessor operates faster and more efficiently when operating from the cache memory rather than the larger and slower external system memory. The cache memory is organized as a sequential series of cache lines, in which each cache line typically has a predetermined length. A common cache line size, for example, is 64 bytes although alternative cache line sizes are contemplated.

The computer program may repetitively execute one or more load instructions, such as in a loop or the like, to load a specified amount of data from a particular memory location in the cache memory. Each load instruction may include a load address and a data length. The load address specified in the software program, however, may not necessarily be the same physical address used by the microprocessor to access the cache memory. Modern microprocessors, such as those based on the x86 instruction set architecture, perform address translation including segmentation and paging and the like, in which the load address is transformed into an entirely different physical address for accessing the cache memory. Furthermore, a series of load operations may be sequentially executed to retrieve a larger block of data, in which one or more of the load instructions do not directly align with the cache line size. As a result, the memory read operation may attempt to load data that crosses a cache line boundary, meaning that the specified data starts on one cache line and ends on the next cache line. Since the target data occupies more than one cache line, this type of memory read operation is known as a cache line unaligned load. A special method is usually required to handle the cache line unaligned load operations because the data is not retrievable using a single normal load request. Modern microprocessors typically use a popular cache structure in which only one cache line is accessible for a single load request, so that the cache line unaligned load operation must be handled in a different manner which negatively impacts performance.

A common solution performed by some microprocessors is to sequentially issue the same load instruction twice at different times within the load pipeline. When the load instruction is initially received by the load pipeline, the address for locating the data is first transformed to a virtual address (and ultimately transformed to a physical address for accessing the cache memory), and it is only then that it is determined that the data load operation crosses a cache line boundary. Such an unaligned load operation invokes a load miss. In the event of a load miss, the load is executed again in the load pipeline, which further introduces a load miss caused replay of instructions that are dependent upon the load operation. Furthermore, a second issue of the unaligned load instruction causes an arbitration between the second issue of the unaligned load instruction and other normal issued load instructions, which will cause a fairly long latency.

In this manner, a cache line unaligned load operation is inefficient and consumes valuable processing time to eventually retrieve the correct data, including initial detection, duplicate execution, arbitration of resources, and replay of dependent instructions. A software program that causes a significant number of cache line unaligned load operations results in inefficient operation and reduced performance.

SUMMARY OF THE INVENTION

A microprocessor for performing speculative parallel execution of a cache line unaligned load instruction according to one embodiment includes a predictor, a front end, an unaligned load dispatcher, a memory system, and merge logic. The predictor predicts whether a load instruction is unaligned. The front end issues instructions to a scheduler and marks the load instruction as unaligned when predicted by the predictor to be unaligned. The unaligned load dispatcher detects a load instruction dispatched from the scheduler marked as unaligned, dispatches the load instruction to a first load pipeline, and dispatches a duplicate of the load instruction marked as unaligned to a second load pipeline. The memory system determines a first address for the load instruction marked as unaligned in the first load pipeline to access first data from a first cache line, and determines a second address for the duplicate of said load instruction marked as unaligned in the second load pipeline to access second data from a second cache line. The merge logic merges the first data and the second data to provide result data for the load instruction marked as unaligned.

A method of performing speculative parallel execution of a cache line unaligned load instruction according to one embodiment includes predicting whether a load instruction is unaligned, marking the load instruction as unaligned when predicted to be an unaligned load, issuing the load instruction marked as unaligned to a scheduler, dispatching the load instruction marked as unaligned to a first load pipeline and dispatching a copy of the load instruction marked as unaligned to a second load pipeline in parallel, determining a first address for the load instruction marked as unaligned in the first load pipeline to access first data from a first cache line, and determining a second address for the copy of the load instruction marked as unaligned in the second load pipeline to access second data from a second cache line, and merging the first data and the second data to provide result data for the load instruction marked as unaligned.

BRIEF DESCRIPTION OF THE DRAWINGS

The benefits, features, and advantages of the present invention will become better understood with regard to the following description, and accompanying drawings where.

DETAILED DESCRIPTION

The inventors have recognized the inefficiencies and lower performance associated with executing cache line unaligned load instructions. They have therefore developed a system and method of speculative parallel execution of cache line unaligned load instructions for detecting and executing a memory read operations that cross a cache line boundary. Detection of a load instruction that crosses a cache boundary is speculatively determined. Many, if not most, load instructions are performed in a loop. In a first detection method, the instruction pointer (IP) of a first iteration of a first unaligned load is stored and compared with subsequent iterations to predict subsequent unaligned loads. In a second detection method, the IP is used to identify subsequent iterations of a load instruction, and a skip stride between two iterations of the load instruction is used to speculate a stride which is used to predict a starting address for subsequent iterations of the load instruction, in which the skip stride is an address skipping length between the end address of a last execution of the load instruction and a start address of a next execution of the load instruction. The predicted start address and the provided data length of each load instruction iteration are used to speculatively predict whether the load crosses a cache boundary. The unaligned load is marked and provided to a scheduler, which dispatches the load instruction as duplicate load instructions in parallel to two separate load execution pipelines. If the load is ultimately determined to be an actually unaligned load when the address is determined in the execute stage, then the first load pipeline retrieves first data from the first cache line, and the second pipeline separately retrieves second data from the next consecutive cache line. The first and second data are then merged together into a single cache line result from the first pipeline. In some embodiments, the load is ultimately determined to be an actually unaligned load after the first and second cache lines are retrieved.

A system and method of speculative parallel execution of cache line unaligned load instructions as described herein is used to improve unaligned load performance. The unaligned load is completed as normal load with no other delays. The unaligned load does not cause replay when a cache hit occurs, and the instruction stream is not stalled because of unaligned load delay. A system and method of speculative parallel execution of cache line unaligned load instructions as described herein is very useful for programs and applications that use multiple unaligned load operations.

Figure 1:
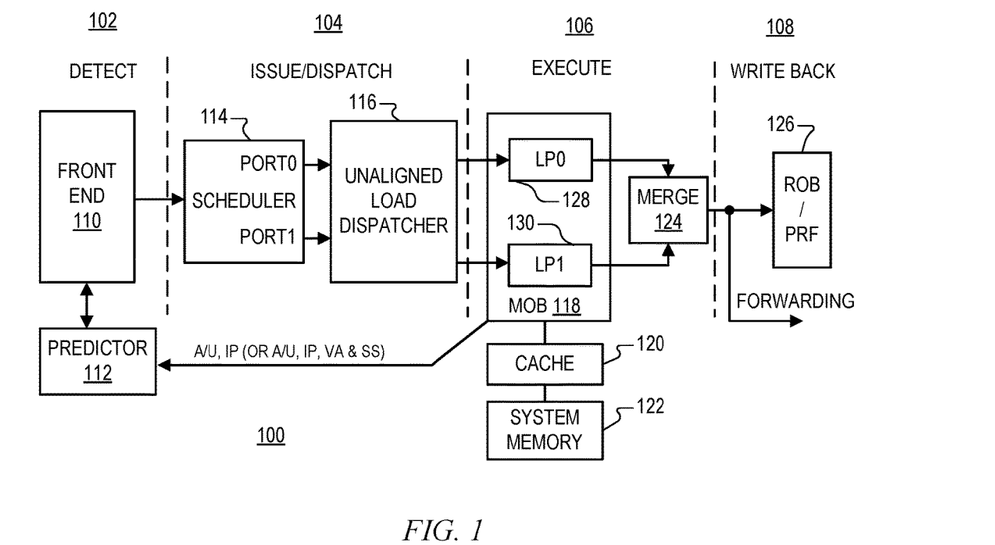
FIG. 1 is a simplified block diagram of a superscalar, pipelined microprocessor that performs a cache line unaligned load operation according to one embodiment of the present invention.

FIG. 1 is a simplified block diagram of a superscalar, pipelined microprocessor 100 that performs a cache line unaligned load operation according to one embodiment of the present invention. The macroarchitecture of the microprocessor 100 may be an x86 macroarchitecture in which it can correctly execute a majority of the application programs that are designed to be executed on an x86 microprocessor. An application program is correctly executed if its expected results are obtained. In particular, the microprocessor 100 executes instructions of the x86 instruction set and includes the x86 user-visible register set. The present invention is not limited to x86 architectures, however, in which microprocessor 100 may be according to any alternative architecture as known by those of ordinary skill in the art.

In the illustrated embodiment, the microprocessor 100 has a pipelined architecture with multiple stages, including a detect stage 102, an issue/dispatch stage 104, an execute stage 106, and a write back stage 108. The stages are shown separated by dashed lines each generally depicting a set of synchronous latches or the like for controlling timing based on one or more clock signals. The detect stage 102 includes a front end 110 and a predictor 112. The front end 110 generally operates to retrieve instructions from memory (e.g., system memory 122) or cache (e.g., cache memory 120) and to issue them to the issue/dispatch stage 104 in program order. The front end 110 may include, for example, an instruction cache (not shown) that caches program instructions from an external system memory 122, an instruction decoder and translator (not shown) that fetches program instructions from the instruction cache and that decodes them into one or more microinstructions for execution, and a register alias table (RAT) (not shown) that generates dependency information for each instruction based on its program order, on the operand sources it specifies, and on renaming information. In one embodiment, instruction translation includes translating macroinstructions of a macroinstruction set of the microprocessor 100 (such as the x86 instruction set architecture) into microinstructions of a microinstruction set architecture of the microprocessor 100.

The front end 110 issues the decoded instructions and their associated dependency information to a scheduler 114 within the issue/dispatch stage 104. The scheduler 114 includes queues that hold the instructions and dependency information received from the RAT. The scheduler 114 dispatches instructions to the execute stage 106 when ready to be executed. An instruction is ready to be executed when all of its dependencies are resolved and an execution unit is available to execute the instruction. Functional instructions, such as floating point instructions (e.g., media type instructions or the like) or integer instructions or the like, are dispatched to functional execution units (not shown). Memory instructions, including load and store instructions, are dispatched to a memory order buffer (MOB) 118. The MOB 118 includes one or more load and store pipelines, or combined load/store pipelines.

In the simplified illustration, only two load pipelines LP0 128 and LP1 130 are shown within the MOB 118, although it is understood that additional load pipelines and store pipelines may be included. The scheduler 114 includes a first port0 for dispatching load instructions to the first load pipeline LP0 128, and includes a second port1 for dispatching load instructions to the second load pipeline LP1 130. The MOB 118 accesses a cache memory 120, such as a level-2 (L2) cache or the like, which stores data and information loaded from the system memory 122 or otherwise to be ultimately stored into the system memory 122. The microprocessor 100 includes a bus interface unit (BIU) or the like (not shown) for interfacing the system memory 122 to the microprocessor 100. The cache memory 120 is typically internal to the microprocessor 100, although externally coupled cache systems are also contemplated.

In conjunction with issuing an instruction, the RAT also allocates an entry for the instruction in a reorder buffer (ROB) 126, which is shown located in the write back stage 108. Thus, the instructions are allocated in program order into the ROB 126, which may be configured as a circular queue to ensure that the instructions are retired in program order. In certain configurations, the allocated entry within the ROB 126 may further include memory space, such as a register or the like, for storing the results of the instruction once executed. Alternatively, the microprocessor 100 includes a separate physical register file (PRF), in which the allocated entry may include a pointer to an allocated register within the PRF for storing result information. A load instruction, for example, retrieves data from the cache memory 120 and temporarily stores the data into the allocated register in the PRF.

The predictor 112 within the detect stage 102 is used to detect or otherwise predict when a load instruction is a cache line unaligned load in which the data to be loaded crosses a cache line boundary of the cache memory 120. When the front end 110 processes each load instruction, it consults the predictor 112 to speculate whether the load instruction is a cache line unaligned load. If the predictor 112 predicts that the load instruction is a cache line unaligned load, then the front end 110 marks or otherwise identifies the load instruction as a cache line unaligned load. For normal load instructions that are not marked as cache line unaligned loads, the scheduler 114 dispatches the load instruction either directly to the first load pipeline LP0 128 via port0 or directly to the second load pipeline LP1 130 via port1, effectively bypassing (or passing directly through) an unaligned load dispatcher 116.

When the issued load instruction has been marked as a cache line unaligned load instruction, then the scheduler 114 dispatches the load instruction via one of its ports and temporarily stalls the other port. The unaligned load dispatcher 116 detects whether the load instruction dispatched from the scheduler 114 is marked as a cache line unaligned load instruction, and if so, the unaligned load dispatcher 116 dispatches the load instruction to both the first load pipeline LP0 128 and the second load pipeline LP1 130. In other words, the same load instruction is effectively dispatched to two different load pipelines in parallel.

The MOB 118 detects that the same load instruction has been dispatched to the two different load pipelines LP0 and LP1 and further determines the start address for the load instruction proceeding in the first load pipeline LP0 128 to retrieve data from a first cache line within the cache memory 120, and determines the start address for the duplicate of the load instruction proceeding in the second load pipeline LP1 130 to retrieve data from the next cache line of the cache memory 120. In detail, the MOB 118 further translates the address of the load instruction into a virtual address, which is ultimately converted to a physical address for directly accessing the cache memory 120. It is noted that the virtual address is sufficient since the applicable lower bits of the virtual address are the same as the physical address (both reference the same-sized page within memory). In one embodiment, for example, a 4 Kbyte page is used in which the lower 12 bits of both the virtual address and the physical address are the same. Once the virtual address is known, and given that the data length is specified by the load instruction itself, the MOB 118 is able to qualify whether or not the load instruction is actually unaligned. In one embodiment, only when the MOB 118 qualifies the load instruction is actually unaligned, the MOB 118 then determines the start addresses for the load instructions proceeding in the first load pipeline LP0 128 and the second load pipeline LP1 130. In another embodiment, the MOB 118 retrieves data from the first and the second cache lines regardless of whether the virtual address indicates the load instruction is actually unaligned or not, and the retrieved two cache lines are then handled by the merge logic 124 according to the actual physical address and the data length.

The corresponding physical address for the virtual address is ultimately determined, such as retrieved from a translation look-aside buffer (TLB) or as a result of a table walk process or the like, in which the first load pipeline LP0 128 uses the physical address or a modified version thereof to access data from the first cache line, and the second load pipeline LP1 130 uses another modified version of the physical address to access data from the second cache line. Such address modification may be based on cache line alignment, alignment based on the data length, or other methods depending upon the particular implementation.

Once the two cache lines are retrieved, merge logic 124 within the execute stage 106 merges the requested data into a single cache line and the result is stored in the ROB 126 or in the allocated register of the PRF. It is noted that the result is generated as though dispatched from one port of the scheduler 114 (e.g., port0) dispatched to one of the load pipelines (e.g., load pipeline LP0 128), and any other data generated for the other port (e.g., port1) and load pipeline (e.g., load pipeline LP1 130) may be discarded.

When the MOB 118 determines that the load instruction is not actually a cache line unaligned load instruction, then the load instruction is processed in the same manner as a normal load instruction. The load instruction proceeds in either one of the first and second load pipelines LP0 128 or LP1 130 and the load instruction in the other load pipeline is discarded. It is noted that a wrongly predicted unaligned load instruction presents a slight performance drop since one of the ports of the scheduler 114 is temporarily stalled and two load pipelines are temporarily used to perform a single load instruction. The performance drop for a wrongly predicted unaligned load instruction is significantly less than the substantial performance drop that occurs when a single load pipeline attempts to perform a load instruction that ultimately turns out to be unaligned.

The MOB 118, after making the determination of whether or not the load instruction is actually a cache line unaligned load instruction, further provides an aligned or unaligned indication (A/U) and the corresponding instruction pointer (IP) of the load instruction. In another embodiment, the MOB 118 may further provide the virtual address (VA) and the skip stride (SS) of the load instruction. The predictor 112 uses this information, including A/U and IP, or A/U, IP, SS and VA, to make future predictions for detecting cache line unaligned load instructions. It is noted that the front end 110 accesses the IP of each load instruction when read from the instruction cache, and that the IP is issued and dispatched along with the load instruction when propagating through the microprocessor pipeline(s). Since load instructions are often re-executed multiple times, such as in a program loop, the IP address is used to identify subsequent occurrences of the same load instruction.

Figure 2:
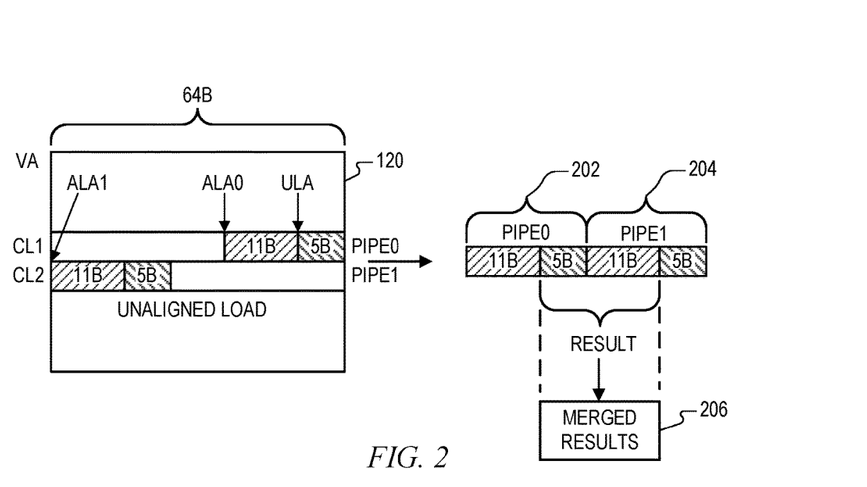
FIG. 2 is a simplified diagram of the result of speculative parallel execution of an unaligned load instruction and the resulting merge operation according to one embodiment of the present invention.

FIG. 2 is a simplified diagram of the result of speculative parallel execution of an unaligned load instruction and the resulting merge operation according to one embodiment of the present invention. The illustration is shown with one type of "endianness" (e.g., big-endian or little-endian), where it is understood that the opposite ordering of bytes is equally contemplated. In this example, the cache line length of the cache memory 120 is 64 bytes (64B) and the unaligned load instruction specifies 16 bytes of data. The address of the unaligned load instruction, shown as ULA, occurs within a first cache line CL1 of the cache memory 120, in which CL1 only includes the first 5 bytes (5B) of the requested data. The remaining 11 bytes (11B) of the requested data occurs on the next cache line CL2. Since the data length for this load instruction is 16 bytes, the unaligned load instruction address ULA may be converted to an adjusted load address ALA0 by the one of the load pipelines (e.g., the first load pipeline LP0 128) in order to load 16 bytes from the first cache line CL1 including the 5 byte portion of the target data. Another load address ALA1 is determined by the other load pipeline (e.g., the second load pipeline LP1 130), such as along the cache line border, to load 16 bytes of the second cache line CL2 including the remaining 11 byte portion of the target data.

As a result of the speculative parallel execution of an unaligned load instruction as described herein, 16 bytes of the first cache line CL1, shown at 202, is returned by one of the load pipelines (e.g., LP0 128), and 16 bytes of the second cache line CL2, shown at 204, is returned by the other load pipeline (e.g., LP1 130). The results are appended together and the requested 16 byte result portion is isolated and loaded into the result register 206. Various methods may be employed to append the results of both pipelines and merge or isolate the results into the applicable destination register 206, including loading, shifting, masking, inverting, etc. or any combination thereof.

Figure 3:
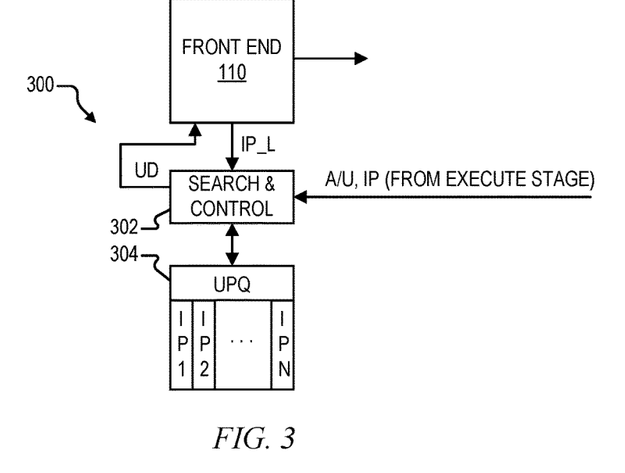
FIG. 3 is a simplified block diagram of a predictor according to one embodiment of the present invention which may be used as the predictor of FIG. 1.

FIG. 3 is a simplified block diagram of a predictor 300 according to one embodiment of the present invention, in which the predictor 300 may be used as the predictor 112 of FIG. 1. In this case, the predictor 300 includes search and control logic 302 for controlling and searching an unaligned predict queue (UPQ) 304. The UPQ 304 is a memory that stores an instruction pointer (IP) for each load instruction that has been determined to be unaligned. The search and control logic 302 is shown as separate from said UPQ 304, but may alternatively be incorporated therein. As shown, for example, the UPQ 304 may store up to an integer number "N" IPs, IP1, IP2, . . . IPN. N is any suitable number for storing a suitable number of IPs for a given configuration. Although not shown, each entry may include a valid value or bit or the like. The UPQ 304 may be maintained according to any type of replacement policy once it becomes full, such as a last recently used (LRU) policy in which a newer IP replaces the oldest IP within the UPQ 304.

When the front end 110 receives a load instruction for execution, it also receives the corresponding IP for the load instruction, shown as IP_L. The front end 110 applies IP_L to the search and control logic 302, which searches the UPQ 304 for a matching IP. The search and control logic 302 asserts an unaligned detect (UD) to the front end 110 indicating whether or not there is a match. For example, UD may be asserted high (e.g., logic "1") when a match is found within the UPQ 304, or asserted low (e.g., logic "0") when no matching IP is found. If a match is found, then the front end 110 marks the corresponding load instruction as an unaligned load instruction. Otherwise when no matching IP is found within the UPQ 304, then the front end 110 does not mark the load instruction.

As previously described, the MOB 118 receives and executes the load instruction, determines whether or not the load instruction is actually a cache line unaligned load instruction, and provides the A/U indication along with the IP of the load instruction. A/U and IP of an executed load instruction are provided to the search and control logic 302. If the load instruction was not initially predicted to be unaligned (e.g., was not previously found within the UPQ 304) but the A/U indication indicates that the load instruction was, in fact unaligned, then the search and control logic 302 updates the UPQ 304 with the IP so that subsequent iterations of the same load instruction will be marked as unaligned. It is noted that any such subsequent iterations of the load instruction may have varying virtual/physical addresses and any one or more may actually not be unaligned load operations. Thus, the prediction may be wrong for one or more subsequent iterations. It has been determined, however, that the penalty of wrongly predicting a load as unaligned is relatively small. In one embodiment, the search and control logic 302 may delete the IP of the load instruction within the UPQ 304 if a consecutive number of wrongly predicted instances of that same load instruction (wrongly predicted as unaligned) reaches a predetermined number of executions.

If the load instruction was predicted to be unaligned (e.g., was previously found within the UPQ 304) but the A/U indication indicates that it is not unaligned (i.e., a normal load instruction that does not cross the cache line boundary), then the search and control logic 302 may or may not remove the corresponding IP from the UPQ 304. As noted above, the penalty of wrongly predicting a load as unaligned is relatively small. In one embodiment as noted, the search and control logic 302 may delete the IP of the load instruction if the consecutive number of wrongly predicted instances of that same load instruction reaches a predetermined number of executions.

Figure 4:
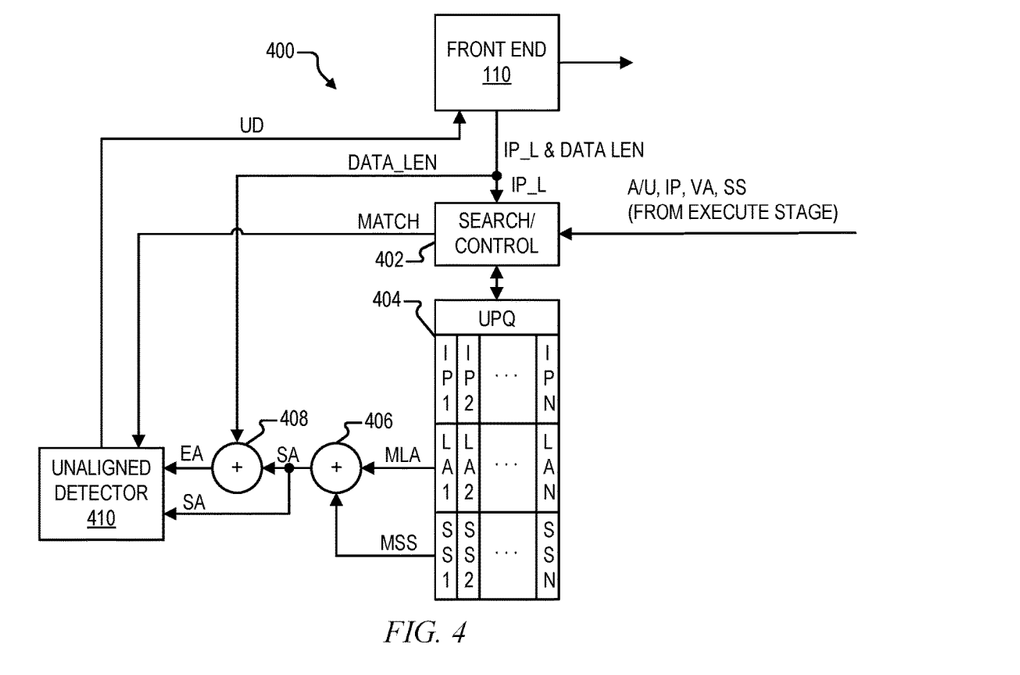
FIG. 4 is a simplified block diagram of a predictor according to another embodiment of the present invention which may also be used as the predictor of FIG. 1.

FIG. 4 is a simplified block diagram of a predictor 400 according to another embodiment of the present invention, in which the predictor 400 may also be used as the predictor 112 of FIG. 1. In this case, the predictor 400 includes search and control logic 402 for controlling and searching another unaligned predict queue (UPQ) 404. The search and control logic 402 is shown as separate from said UPQ 404, but may alternatively be incorporated therein. The UPQ 404 is a memory that also stores an instruction pointer (IP) for each load that has been determined to be an unaligned load instruction in a similar manner as the UPQ 304. For each IP stored, the UPQ 404 additionally stores a "last address" and a "skip stride" that correspond with the IP of the load instruction. Thus, for each IP stored IP1, IP2, . . . IPN, the UPQ 404 also stores a corresponding last address LA1, LA2, . . . , LAN and a corresponding skip stride SS1, SS2, . . . , SSN. In this embodiment, each last address LA is provided from the MOB 118 as its virtual address VA. The addresses of the same load instruction in two continuous iterations may be not continuous. The "skip stride" is an address skipping length between the end address of the last execution of a load instruction and the start address of the next execution of the load instruction, and in this embodiment, each skip stride is determined by monitoring the recent executions of the corresponding load instruction. If the skip stride of the load instruction is relatively consistent, the load address of the next iteration of the corresponding load instruction is predicted by the corresponding last address and the skip stride, and this kind of predictable and actually unaligned load instruction is recorded in the UPQ 404.

In this case, when the front end 110 receives a load instruction for execution, it applies IP_L and the data length (DATA_LEN) of the load instruction to the search and control logic 404, which searches the UPQ 404 for a matching IP. If there is a match, that means a previous iteration of the load instruction was detected by the MOB 118 as being actually unaligned. In the event of a match, the search and control logic 402 asserts a MATCH signal, and causes the UPQ 404 to output the corresponding last address and skip stride corresponding to the matching IP, shown as MLA and MSS. The matching last address MLA and skip stride MSS of the matching entry are provided to respective inputs of a first adder 406, which outputs a starting address SA for the new iteration of the load instruction. Thus, SA is a prediction of the starting address of the new load instruction.

The predicted starting address SA is provided to one input of a second adder 408 which receives DATA_LEN at its other input and outputs an ending address EA for the new iteration of the load instruction. SA, EA and MATCH are provided to inputs of an unaligned detector 410, which asserts the UD signal to the front end 110. In particular, if there is a matching entry and if SA and EA are not within the same cache line of the cache memory 120, then the load instruction is considered unaligned and the unaligned detector 410 asserts UD to indicate that the load instruction is unaligned. If, however, SA and EA are within the same cache line of the cache memory 120 even though there is a matching IP, then the load instruction is considered aligned (normal) and the unaligned detector 410 de-asserts UD to indicate that the load instruction is not unaligned. The front end 110 marks the load instruction accordingly based on the UD signal.

It is noted that when a matching IP is found but the load instruction is deemed aligned (or not unaligned), the IP, the corresponding last address LA and the skip stride are not necessarily removed from the UPQ 404 at that time. First, the load instruction may, in fact, be unaligned as determined by the MOB 118, in which the corresponding last address is updated with the corresponding virtual address VA of the executed unaligned load. Second, since at least one iteration was determined as unaligned, then subsequent iterations of the load instruction may include additional unaligned occurrences so that it is more efficient to keep the entry stored in the UPQ 404 even when some iterations turn out to be aligned. As noted above, it will cause less penalty to predict that the load is unaligned and be wrong than to predict that the load is aligned and be wrong. If a consecutive number of subsequent iterations are aligned, then the entry may be removed.

The operation of updating the UPQ 404 based on results of the MOB 118 is similar to that described for the UPQ 304, except that the determined virtual address VA and skip stride are also provided for determining predictions. A/U, IP, SS and VA of an executed load instruction are provided to the search and control logic 402. If the load instruction was not predicted to be unaligned (e.g., was not previously found within the UPQ 404) but the A/U indication indicates that it is unaligned, then the search and control logic 402 updates the UPQ 404 with the IP, SS and VA so that subsequent iterations of the same load instruction may be marked as unaligned as determined by the predictor 400. Again, the prediction may be wrong for one or more subsequent iterations, in which the penalty of wrongly predicting a load as unaligned is relatively small. As with the predictor 300, the search and control logic 402 of the predictor 400 may delete the IP/LA/SS entry of the load instruction if the consecutive number of wrongly predicted instances of that same load instruction reaches a predetermined number of executions. Also, if the load instruction was predicted to be unaligned (e.g., was previously found within the UPQ 404) but the A/U indication indicates that it is not unaligned (i.e., a normal load instruction that does not cross the cache line boundary), then the search and control logic 402 may or may not remove the corresponding IP from the UPQ 404, such as depending upon the number of consecutive wrong predictions.

Figure 5:
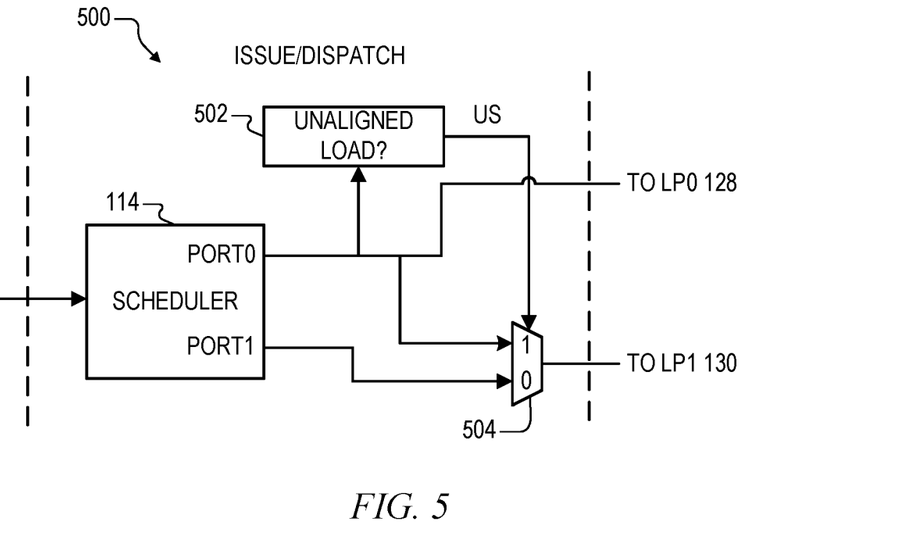
FIG. 5 is a simplified block diagram of an unaligned load dispatcher according to one embodiment of the present invention which may be used as the unaligned load dispatcher of FIG. 1.

FIG. 5 is a simplified block diagram of an unaligned load dispatcher 500 according to one embodiment of the present invention, which may be used as the unaligned load dispatcher 116 of FIG. 1. The unaligned load dispatcher 500 includes an unaligned load sensor 502 and a multiplexer (MUX) 504. The unaligned load sensor 502 detects unaligned load instructions (e.g., any load instructions marked as unaligned) dispatched from port0 of the scheduler 114 and asserts a select signal US accordingly. US is provided to the select input of the MUX 504, which has a first or logic "0" input coupled to the output port1 of the scheduler 114, and which has a second or logic "1" input coupled to the output port0 of the scheduler 114. The output of the MUX 504 is provided to the load pipeline LP1 130. Normally, normal (aligned) load instructions dispatched from port0 are provided to the load pipeline LP0 128, and the US signal is low (or logic "0") so that normal load instructions dispatched from port1 are provided to the load pipeline LP1 130.

In this case, the scheduler 114 is configured to dispatch unaligned load instructions (e.g., any load instructions marked as unaligned) via port0 and to temporarily stall port1. The unaligned load sensor 502 senses any load instructions dispatched from port0 of the scheduler 114 marked as unaligned, and asserts the US signal high (or to logic "1") causing the MUX 504 to instead select port0 of the scheduler 114. In this manner, when an unaligned load instruction is dispatched via port0 of the scheduler 114, it is dispatched to both load pipelines LP0 128 and LP0 130 for parallel execution as previously described.

Figure 6:
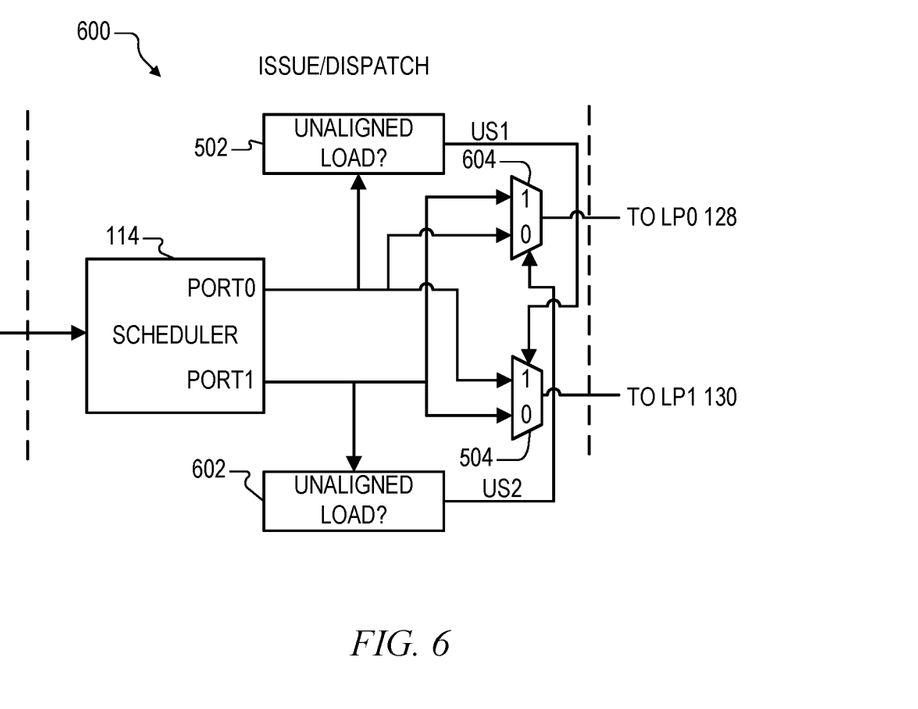
FIG. 6 is a simplified block diagram of an unaligned load dispatcher according to another embodiment of the present invention which may also be used as the unaligned load dispatcher of FIG. 1.

FIG. 6 is a simplified block diagram of an unaligned load dispatcher 600 according to another embodiment of the present invention, which may also be used as the unaligned load dispatcher 116 of FIG. 1. The unaligned load dispatcher 600 also includes the unaligned load sensor 502 and the MUX 504 coupled in substantially the same manner, in which the unaligned load sensor 502 senses unaligned load instructions dispatched from port0 of the scheduler 114 and controls the MUX 504 accordingly. The US signal is shown as a signal US1 in this case. The unaligned load dispatcher 600 further includes an unaligned load sensor 602 and a second MUX 604. The unaligned load sensor 602 senses unaligned load instructions dispatched from port1 of the scheduler 114 and controls the MUX 604 via a signal US2 accordingly. In this case, port0 of the scheduler 114 is provided to a logic "0" input of the MUX 604, and port1 of the scheduler 114 is provided to a logic "1" input of the MUX 604. Normally, US1 and US2 are both low so that normal (aligned) load instructions dispatched from port0 are provided to the load pipeline LP0 128, and normal load instructions dispatched from port1 are provided to the load pipeline LP1 130.

In this case, the scheduler 114 is configured to dispatch unaligned load instructions (e.g., any load instructions marked as unaligned) via either port0 or port 1 and to temporarily stall the other port. For example, if the scheduler 114 dispatches an unaligned load via port1, then port0 is temporarily stalled and vice-versa. The unaligned load sensor 502 operates in the same manner as for the unaligned load dispatcher 500 in which it senses any load instructions dispatched from port0 of the scheduler 114 marked as unaligned, and asserts the US1 signal high (or to logic "1") causing the MUX 504 to instead select port0 of the scheduler 114. In this manner, when an unaligned load instruction is dispatched via port0 of the scheduler 114, it is dispatched to both load pipelines LP0 128 and LP0 130. In addition, the unaligned load sensor 602 operates in a similar manner and senses any load instructions dispatched from port1 of the scheduler 114 marked as unaligned, and asserts the US2 signal high (or to logic "1") causing the MUX 604 to instead select port1 of the scheduler 114. In this manner, when an unaligned load instruction is dispatched via port1 of the scheduler 114, it is dispatched to both load pipelines LP0 128 and LP0 130 for parallel execution as previously described.

In summary, a predictor in a first or detect stage of a microprocessor is used to speculate whether or not a load instruction being issued to a scheduler is unaligned. A front end of the microprocessor marks the load instruction accordingly. An unaligned load dispatcher in an issue/dispatch stage of the microprocessor detects a load instruction being dispatched to an execute stage of the microprocessor marked as unaligned, and dispatches duplicate copies of the load instruction in parallel to two load pipelines in the execute stage. A memory system (e.g., MOB or the like) within the execute stage determines an address (e.g., virtual address) for the load instruction, qualifies the load instruction as actually unaligned or not, and provides the determination for access by the predictor. This information is used to update and improve subsequent unaligned load instruction predictions. The memory system adjusts the physical addresses for the duplicate loads to retrieve a first portion of the target load data from a first cache line in one load pipeline, and at the same time to retrieve a remaining portion of the target data from a next cache line in the other load pipeline. Merge logic within the execute state merges the results from both load pipelines to provide the merged results as the proper result of the load instruction marked as unaligned if the load instruction is determined to be actually unaligned. If instead the load instruction is determined to be aligned (i.e., not unaligned), then the load instruction proceeds in one load pipeline as a normal load instruction and the results of the other load pipeline are discarded.

It is appreciated that cache line unaligned load instructions are speculatively determined and may be mis-predicted. If a prediction fails to identify a load instruction as unaligned, the resulting degradation of performance for that load instruction is substantially the same as a conventional configuration. If the prediction incorrectly marks a normal load instruction as unaligned when in fact it is not, there is only a slight degradation in performance as compared to executing the load as normal. When the prediction correctly identifies an unaligned load instruction, however, a substantial improvement in performance is achieved, primarily because the substantial degradation associated with attempting to execute an unaligned load instruction as though normal is avoided. Since a system and method of speculative parallel execution of cache line unaligned load instructions as described herein correctly predicts a significant number of unaligned load instructions, the overall efficiency and performance of the microprocessor is significantly improved as compared to conventional configurations.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A microprocessor that performs speculative parallel execution of a cache line unaligned load instruction, comprising:
    a predictor that predicts whether a load instruction is unaligned;
    a front end that issues instructions to a scheduler, wherein said front end marks said load instruction as an unaligned load instruction when the predictor predicts the load instruction is unaligned;
    an unaligned load dispatcher detecting whether said load instruction dispatched from said scheduler is marked as the unaligned load instruction, wherein when the said load instruction dispatched from said scheduler is marked as the unaligned load instruction, the unaligned load dispatcher dispatches said load instruction marked as the unaligned load instruction to both a first load pipeline and a second load pipeline in parallel;
    a memory system comprising said first and second load pipelines, wherein said memory system determines a first address for said load instruction marked as the unaligned load instruction in said first load pipeline to access first data from a first cache line, and that determines a second address for said load instruction marked as the unaligned load instruction in said second load pipeline to access second data from a second cache line; and
    merge logic that merges said first data and said second data to provide result data for said load instruction marked as the unaligned load instruction,
    wherein the first pipeline is separate from the second pipeline,
    wherein said scheduler comprises a first port for dispatching load instructions to said first load pipeline and a second port for dispatching load instructions to said second load pipeline, and
    wherein responsive to said load instruction being marked as unaligned, the scheduler dispatches the load instruction marked as unaligned from one of the first port and the second port and temporarily stalls the other port.

2. The microprocessor of claim 1, wherein said memory system further qualifies whether said load instruction marked as the unaligned load instruction is actually unaligned and provides an unaligned indication thereof, and when said load instruction marked as the unaligned load instruction is determined to be actually unaligned, that determines said first address and said second address.

3. The microprocessor of claim 2, wherein said predictor comprises:
a queue that stores an unaligned instruction pointer of each load instruction that has been qualified as actually unaligned; and
search and control logic that receives an instruction pointer of a new load instruction from said front end, and that provides an unaligned detect signal to said front end when a match with said instruction pointer is found within said queue.

4. The microprocessor of claim 3, wherein when said instruction pointer of said new load instruction matches one of stored unaligned instruction pointers of load instructions that have been qualified as actually unaligned, the match with said instruction pointer is found.

5. The microprocessor of claim 3, wherein said search and control logic receives said unaligned indication from said memory system and a corresponding unaligned instruction pointer, and stores said unaligned instruction pointer into said queue when said unaligned indication indicates that a corresponding load instruction was actually unaligned.

6. The microprocessor of claim 2, wherein said predictor comprises:
a queue that stores an unaligned instruction pointer, a last address and a skip stride of each load instruction that has been qualified as actually unaligned;
search and control logic that receives an instruction pointer of a new load instruction from said front end, and that provides a match signal when a matching entry matching with said instruction pointer is found within said queue;
adding logic that determines a start address and an end address of said new load instruction using a data length of said new load instruction, a corresponding last address and a corresponding skip stride of said matching entry; and
an unaligned detector that provides an unaligned detect signal to said front end when said match signal is provided and said start address and said end address indicate said new load instruction was unaligned.

7. The microprocessor of claim 6, wherein said search and control logic receives said unaligned indication from said memory system, a corresponding unaligned instruction pointer, a corresponding skip stride and a corresponding address, and stores said unaligned instruction pointer, said corresponding skip stride and said corresponding address into said queue when said unaligned indication indicates that a corresponding load instruction was actually unaligned.

8. The microprocessor of claim 6, wherein said skip stride is an address stride between an end address of a first execution of said load instruction and a start address of a second execution of said load instruction.

9. The microprocessor of claim 1, wherein
said unaligned load dispatcher comprises:
select logic that selects between said first port and said second port of said scheduler for dispatching load instructions to said second load pipeline based on a select signal; and
an unaligned load sensor that asserts said select signal to cause said select logic to select said first port when said load instruction marked as the unaligned load instruction is dispatched from said first port of said scheduler.

10. The microprocessor of claim 1,
wherein said unaligned load dispatcher comprises:
first select logic that selects between said first port and said second port of said scheduler for dispatching load instructions to said second load pipeline based on a first select signal;
second select logic that selects between said first port and said second port of said scheduler for dispatching load instructions to said first load pipeline based on a second select signal;
a first unaligned load sensor that asserts said first select signal to cause said first select logic to select said first port when said load instruction marked as the unaligned load instruction is dispatched from said first port of said scheduler; and
a second unaligned load sensor that asserts said second select signal to cause said second select logic to select said second port when said load instruction marked as the unaligned load instruction is dispatched from said second port of said scheduler.

11. A method of performing speculative parallel execution of a cache line unaligned load instruction, comprising:
predicting whether a load instruction is unaligned;
marking said load instruction as an unaligned load instruction when the load instruction is unaligned;
issuing the load instruction marked as the unaligned load instruction to a scheduler;
dispatching the load instruction marked as the unaligned load instruction to both a first load pipeline and a second load pipeline in parallel when said load instruction is marked as the unaligned load instruction;
determining a first address for said load instruction marked as the unaligned load instruction in the first load pipeline to access first data from a first cache line, and determining a second address for said copy of said load instruction marked as the unaligned load instruction in the second load pipeline to access second data from a second cache line; and
merging the first data and the second data to provide result data for the load instruction marked as the unaligned load instruction,
wherein the first pipeline is separate from the second pipeline, and
wherein said scheduler comprises a first port for dispatching load instructions to said first load pipeline and a second port for dispatching load instructions to said second load pipeline, and
wherein responsive to said load instruction being marked as unaligned, the scheduler dispatches the load instruction marked as unaligned from one of the first port and the second port and temporarily stalls the other port.

12. The method of claim 11 further comprising:
translating an address of the load instruction marked as the unaligned load instruction to a virtual address; and
determining whether the load instruction marked as the unaligned load instruction is actually unaligned based on the virtual address and a data length of the load instruction marked as the unaligned load instruction.

13. The method of claim 12 further comprising:
after the load instruction marked as the unaligned load instruction is qualified as actually unaligned, determining said first address and said second address.

14. The method of claim 12, wherein said predicting whether a load instruction is unaligned comprises:
storing an unaligned instruction pointer for each load instruction that is qualified as actually unaligned; and
indicating that a new load instruction is unaligned when an instruction pointer of the new load instruction matches a stored unaligned instruction pointer.

15. The method of claim 12, wherein said predicting whether a load instruction is unaligned comprises:
storing an unaligned instruction pointer, a corresponding virtual address and a skip stride for each load instruction that is qualified as actually unaligned;
comparing an instruction pointer of a new load instruction with stored instruction pointers to determine whether a match is found;
when a matching instruction pointer is found, determining a start address and an end address for the new load instruction based on a corresponding virtual address and a corresponding skip stride that are stored with said matching instruction pointer and a data length of the new load instruction; and
indicating whether the new load instruction is unaligned based on the start address and the end address.

16. The method of claim 15, wherein said skip stride is an address stride between an end address of a first execution of said load instruction and a start address of a second execution of said load instruction.

17. The method of claim 15, wherein said determining a start address for the new load instruction comprises adding the corresponding skip stride to an end address of a corresponding load instruction that is qualified as actually unaligned.

18. The method of claim 15, wherein said determining an end address for the new load instruction comprises adding the data length of the new load instruction to the start address.

19. The method of claim 11, wherein said dispatching the load instruction marked as the unaligned load instruction comprises:
dispatching the load instruction marked as the unaligned load instruction only from the first port of the scheduler to the first load pipeline;
stalling the second port of the scheduler when the load instruction marked as the unaligned load instruction is dispatched from the first port of the scheduler; and
dispatching the load instruction marked as the unaligned load instruction to the second load pipeline in parallel when sensing that the load instruction marked as the unaligned load instruction has been dispatched from the first port of the scheduler.

20. The method of claim 11, wherein said dispatching the load instruction marked as the unaligned load instruction comprises:
dispatching the load instruction marked as the unaligned load instruction from the first port of the scheduler to the first load pipeline or dispatching the load instruction marked as the unaligned load instruction from the second port of the scheduler to the second load pipeline;
stalling the second port of the scheduler when the load instruction marked as the unaligned load instruction is dispatched from the first port, and stalling the first port of the scheduler when the load instruction marked as the unaligned load instruction is dispatched from the second port;
dispatching the load instruction marked as the unaligned load instruction to the second load pipeline in parallel when sensing that the load instruction marked as the unaligned load instruction has been dispatched from the first port of the scheduler; and
dispatching the load instruction marked as the unaligned load instruction to the first load pipeline in parallel when sensing that the load instruction marked as the unaligned load instruction has been dispatched from the second port of the scheduler.

* * * * *